Dec. 5, 1939.   R. CHILTON   2,182,658
CONTROL WHEEL
Filed Feb. 7, 1939
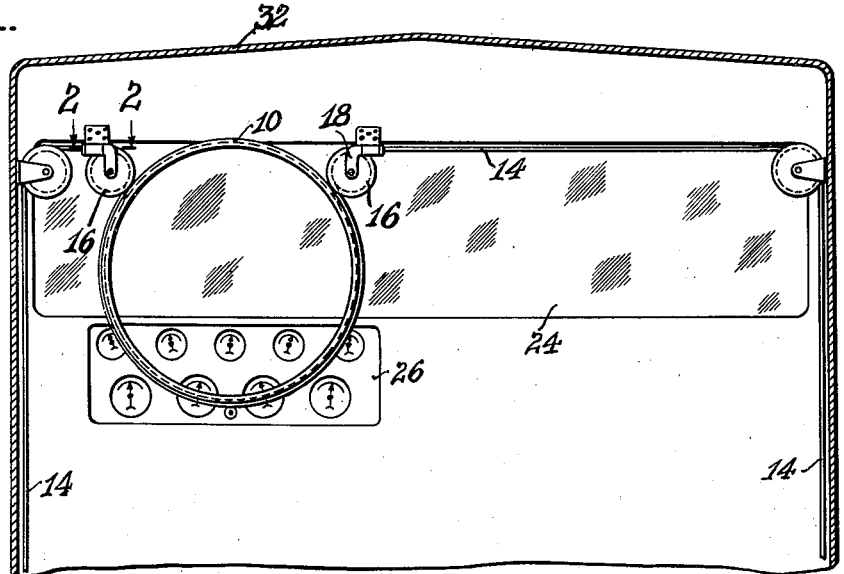
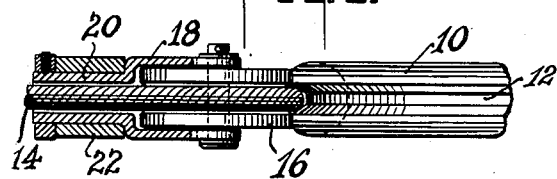
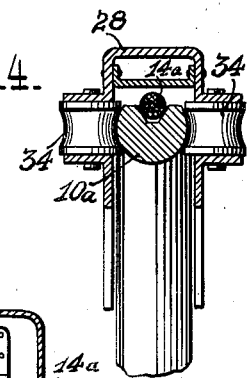
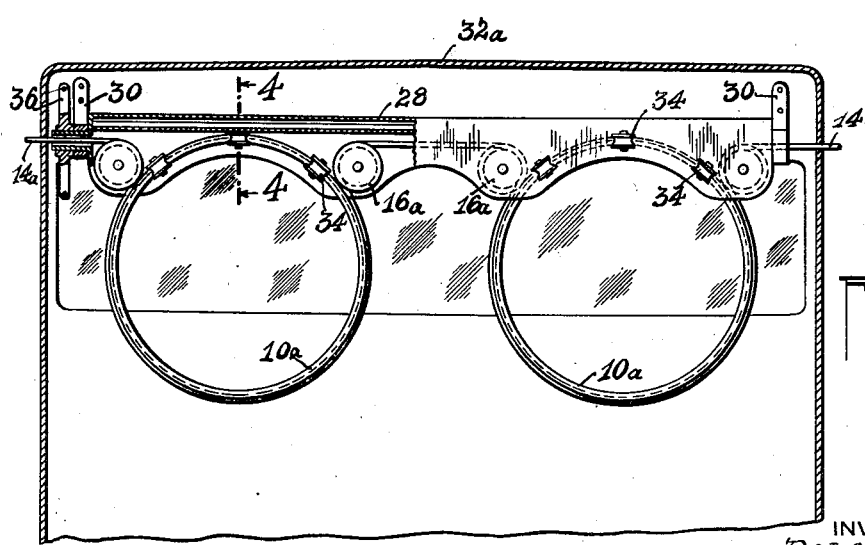
INVENTOR
*ROLAND CHILTON*
BY
ATTORNEY Patented Dec. 5, 1939

2,182,658

UNITED STATES PATENT OFFICE 2,182,658

CONTROL WHEEL

Roland Chilton, Ridgewood, N. J.

Application February 7, 1939, Serial No. 254,991

9 Claims. (Cl. 74—471)

My invention relates to control mechanism for vehicles, and more particularly to mechanism for controlling the ailerons and elevators of airplanes.

In airplanes, for example, the normal pilot's control comprises a spoked wheel mounted on a yoke so that the lower part of the wheel rim clears the pilot's knees. In this conventional disposition, the wheel, hub, bearing, supporting structure and spokes usually interfere with the pilot's view of the instrument board, and in boats and automobiles, the upper part of the wheel rim often interferes with the straight-ahead vision of the operator. To overcome these objections, and especially in airplanes, both spokeless wheels and segmental wheels, wherein the upper part of the wheel rim is omitted, have been proposed, and in many instances adopted. Such wheels are usually mounted on annular roller track means supported on a rocking column passing between the pilot's knees, and from which track means the rim is supported on stumps or the like to afford the pilot a satisfactory hand grip. Neither of these types of steering wheel can be said to be entirely satisfactory.

As will be readily understood from the following description, the present invention contemplates a much simplified structure wherein all of the advantages of a clear vision control or steering wheel are provided.

In the drawing:

Fig. 1 is a diagrammatic cross section through the wheel-house of a boat embodying the invention;

Fig. 2 is a detailed fragmentary view in part section on the line 2—2 of Fig. 1, illustrating a swivelling control pulley;

Fig. 3 is a sectional diagram through the cockpit of an airplane incorporating a fore-and-aft elevator control motion in addition to rotational aileron control movement, and Fig. 4 is a detailed section on the line 4—4 of Fig. 3.

Referring first to Fig. 1, a spokeless wheel rim 10 has a V groove 12 (see Fig. 2) formed in its exterior circumference to receive a control cable 14. The cable passes over two correspondingly grooved pulleys 16 carried in forks 18 having trunnions 20 (Fig. 2) journalled in brackets 22 suitably secured to the upper part of the cabin structure 32. It also passes through the hollow trunnions 20 of the grooved pulleys 16 and around the lower and major part of the circumference of the wheel.

The flange diameters of the wheel 10 and pulleys 16 are conformed to the pitch circle of the cable so that when the cable is tightened at assembly the wheel is held into firm rolling contact with the pulleys. This contact with the pulleys prevents upward and lateral movement of the wheel, while downward displacement is prevented by the tension on the cable which reacts to maintain the rolling contact.

In this simple rudder control (designed especially for boat installation) the swivelling of the pulley supporting forks 18 has no control function and is included for convenience in permitting the pilot to move the wheel fore and aft to the most comfortable position and to permit him to push the wheel forward against the instrument board for convenience in entering and leaving the seat.

It will now be seen that with this disposition the area of the windshield 24 immediately ahead of the pilot is entirely unobscured by wheel spokes, hub or supporting structure and that the upper part of the wheel is above the pilot's line of vision. Similarly, there is a minimum of interference with the pilot's view of the various instruments indicated diagrammatically at 26.

Figs. 3 and 4 show an embodiment suitable for airplanes wherein the fore and aft wheel motion may be connected to operate elevators. In these figures elements corresponding to those in Fig. 1 have been indicated by corresponding reference numerals with the addition of the suffix (a). Thus, the wheel rim 10—a engages pulleys 16—a mounted in a rocking cross-yoke 28 supported in trunnion bearings 30 secured to the cabin structure 32—a. The cable 14—a passes over the pulleys 16—a, around the wheels 10—a as described in connection with Fig. 1, and from the wheel rims outwardly to the ailerons (not shown).

In this aileron and elevator control embodiment, however, the yoke 28 is made of channel section to embrace the upper segment of the wheel and is provided with a plurality of guide rollers 34 engaging opposed sides of the upper portion of the wheel by which means any swinging motion of the wheel is imparted to the yoke. A suitable lever 36 secured to one of the yoke trunnions 30 cooperates with the usual elevator control.

It will now be seen that, by the novel provisions of this invention, a spokeless wheel is suspended for rotary and fore-and-aft control motions, in a simple structure which offers no interference with the operator's view, and that the normal control column is eliminated.

I am aware that "stick" controls depending from the cabin roof have been used to eliminate interference with the pilot's knees, but as far as I am aware, this is the first proposal to apply this disposition to a wheel type control.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A control wheel comprising a spokeless hand rim having a cable groove therein, a pair of grooved pulleys in rolling contact with said rim, and a control cable wrapped in tension around said rim and pulleys to maintain such rolling contact.

2. Control means including a pair of guide pulleys, an annular rim cooperating with said pulleys, and a control cable wrapped around said rim and pulleys and forming therewith the supporting means for said rim.

3. A control means including a control cable, a rim embraced by the cable to comprise a hand wheel, and supporting pulleys from which the cable pays-off onto said rim and whereby the rim is located in rolling contact with the pulleys.

4. Control means including a pair of spaced pulleys, a pivotally mounted yoke carrying said pulleys for swinging movement, a spokeless control wheel rim in rolling contact with said pulleys, a first control cable passed around said rim and pulleys and leading off coaxially with said pivot mounting responsively to rotation of said wheel, and a second control means responsive to swinging movement of said wheel and yoke.

5. Control means including a swinging yoke member, a spokeless hand rim depending from said member, guide rollers mounted in said member and engaging opposed sides of said rim whereby swinging movement of said rim is communicated to the yoke, a pair of pulleys mounted in said yoke in rolling contact with the circumference of said rim, a first control cable wrapped around said rim and pulleys for operation by rotation of the rim, and a second control means operated by fore and aft swinging of said yoke and rim.

6. In an operator's control for a vehicle having a cabin, a spokeless wheel rim disposed for the operator to have forward vision therethrough, a transverse yoke swingingly supported in said cabin above the operator's line of vision, rollers in said yoke engaging said rim for swinging motion thereof with the yoke, a pair of pulleys in rolling contact with the circumference of said rim, a control cable wrapped around said rim and pulleys and effective to maintain said contact, and further control means operated by swinging motion of said yoke.

7. A control means including a pair of pulleys, means mounting said pulleys for swinging action about a transverse axis above the horizontal vision line of an operator, a first control cable having a loop depending between said pulleys, and an operator's control rim embraced by said loop and held thereby in rolling contact with said pulleys.

8. A control means including a pair of pulleys, means mounting said pulleys for swinging action about a transverse axis above the horizontal vision line of an operator, a first control cable having a loop depending between said pulleys, an operator's control rim embraced by said loop and held thereby in rolling contact with said pulleys, and a second control means operated by said swinging action.

9. A supporting means for a spokeless rotatable hand wheel comprising a pair of pulleys in rolling contact with the wheel, and a control cable wrapped around said wheel and pulleys.

ROLAND CHILTON.